United States Patent
Fink et al.

(10) Patent No.: US 6,315,089 B1
(45) Date of Patent: Nov. 13, 2001

(54) SAFETY LOCK DEVICE WITH ROTATING CLOVER MECHANISM

(75) Inventors: John Fink, Portage, IN (US); Harry E. Schilling, Steger, IL (US)

(73) Assignee: Morgan Marshall Industries, Inc., Chicago Heights, IL (US)

( * ) Notice: Subject to any disclaimer, the term of this patent is extended or adjusted under 35 U.S.C. 154(b) by 0 days.

(21) Appl. No.: 09/387,533

(22) Filed: Aug. 31, 1999

(51) Int. Cl.[7] ........................................... B60T 8/72
(52) U.S. Cl. ..................... 188/189; 188/31; 188/82.7; 74/577 M; 187/360; 187/374; 187/351; 187/367; 192/43.1; 192/116.5
(58) Field of Search .................. 192/43.1, 116.5, 192/140; 188/82.7, 67, 31, 189; 187/89, 360, 374, 351, 355, 367, 372, 373; 74/577 M, 577 SF, 577 S, 577 R, 576, 575; 160/189, 300, 296

(56) References Cited

U.S. PATENT DOCUMENTS

| 130,977 | * | 9/1872 | Campbell | 160/296 |
|---|---|---|---|---|
| 167,560 | * | 9/1875 | Pearce | 187/373 |
| 176,015 | * | 4/1876 | Lake | 160/296 |
| 271,691 | * | 2/1883 | Quillfeldt | 160/296 |
| 274,770 | * | 3/1883 | Herrick | 187/373 |
| 275,657 | * | 4/1883 | How | 187/373 |
| 433,931 | * | 8/1890 | Bright | 187/373 |
| 826,284 | * | 7/1906 | Hayward | 160/296 |
| 869,396 | * | 10/1907 | Sweetland | 160/296 |
| 975,828 | * | 11/1910 | Bush | 187/373 |
| 1,140,199 | * | 5/1915 | Smith | 160/296 |
| 1,411,865 | * | 4/1922 | Moors | 160/296 |
| 2,956,643 | * | 10/1960 | Halstead | 187/8.49 |
| 3,842,892 | * | 10/1974 | Stieler | 160/133 |
| 4,125,142 | * | 11/1978 | Fohl | 160/291 |
| 4,604,828 | * | 8/1986 | Baarse | 49/322 |
| 4,823,633 | * | 4/1989 | Pike | 74/411.5 |
| 5,226,342 | * | 7/1993 | Panin | 74/575 |
| 5,971,055 | * | 10/1999 | Rohaut | 160/300 |
| 6,070,641 | * | 6/2000 | Budettie | 160/320 |

* cited by examiner

Primary Examiner—Christopher P. Schwartz
Assistant Examiner—Benjamin A Pezzlo
(74) Attorney, Agent, or Firm—Robert F. I. Conte; Lee, Mann, Smith, McWilliams, Sweeney & Ohlson

(57) ABSTRACT

A safety lock device including a clover mechanism mounted on a rotating shaft to be used with an unbalanced free-fall dog that precludes rotation of the rotating shaft upon rapid acceleration or excessive speed of the rotation of the shaft. The free-fall dog is pivotally mounted on a fulcrum upon which the free-fall dog may teeter in an unbalanced seesaw motion. At opposite ends of the fulcrum are a locking finger and an arm. The free-fall dog is unbalanced such that the arm contacts the clover mechanism as it rotates while the locking finger does not contact the clover mechanism at slow rotating speed. At a slow rotative speed, the arm is only slightly deflected. With great acceleration, the arm is deflected farther from the clover mechanism thereby causing the locking finger on the opposite side of the fulcrum to be pivoted into the clover mechanism. The locking finger, which upon sufficient force to the arm, is injected into the gap between two protuberances of the clover mechanism by a reactive force to the force asserted on the arm. This locks the clover mechanism, which prevents further rotation of the rotative shaft. Thus, the downward movement of any items attached to the rotating shaft is stopped.

14 Claims, 4 Drawing Sheets

SAFETY LOCK DEVICE WITH ROTATING CLOVER MECHANISM

BACKGROUND OF THE INVENTION

The present invention generally relates to a safety device for racks that are vertically adjustable while controlled by an overhead rotating shaft. More specifically, the invention is directed toward a clover mechanism mounted on a rotary shaft to be used with an unbalanced free-fall dog that precludes rotation of the rotating shaft upon excessive acceleration, such as after catastrophic failure of the control mechanism for the rotating shaft.

Typically, overhead racks are used in commercial settings to conserve space within the facility. A typical rack is approximately fifty feet long (sixteen meters) and can be raised and lowered by a double chain motor that is attached to a rotating shaft. A flexible strap may wrap around the rotating shaft thereby shortening the amount of strap hanging below the rotating shaft and raising the rack. As an example, a bicycle rack consists of numerous hooks extending therefrom to hold bicycles from their front or rear wheels. The rack is raised and lowered as needed to load, view or remove the bicycles from the rack.

When a chain or belt breaks or dislodges from the gear or rotating cylinder, the rack can come crashing down. There are presently safety mechanisms to be used in association with the gear or rotating cylinder, such as the double chain in case one chain breaks or dislodges. Also, with a long rotating shaft constantly being placed under excessive stress, the shaft may fail in rare occasions.

A need exists to provide additional safety features for racks attached to rotating shafts and the like. The utilization of a construction that locks upon rapid or uncontrolled rotation of the rotating shaft is a desirable complementary safety feature.

Accordingly, it would be desirable to provide a safety lock device that is activated by rapid force on an arm of an unbalanced free-fall dog that pivotally reacts and locks before the rack drops a significant distance.

In connection with the foregoing objectives, it would also be a goal to have a safety device that allows the rack to freely move up and down at a slow rotative speed relative to the rotating shaft.

Moreover, it would be significant in the industry to provide a safety mechanism that can be attached to the rotating shaft at a location away from the chain, gears or other driven mechanisms.

It has therefore been found beneficial to produce an unbalanced free-fall dog that functions in conjunction with a clover mechanism that is mounted on the rotating shaft. Further aspects and benefits of the invention will be appreciated by those practicing the operation of rotating shafts.

SUMMARY OF THE INVENTION

The invention may be described as a safety lock device including a clover mechanism mounted on the rotating shaft to be used with an unbalanced free-fall dog that precludes rotation of the rotating shaft upon rapid acceleration or excessive speed of the rotation of the shaft. The present invention is a safety lock device primarily for use as a means for stopping the rotation of a rotating shaft upon which items are hung, such as a bicycle rack.

Additionally, the invention provides for a safety lock device that is activated by rapid force on an arm of an unbalanced free-fall dog that pivotally reacts and locks before the rack drops a significant distance. The free-fall dog is pivotally mounted wherein a pin acts as a fulcrum upon which the free-fall dog may teeter in an unbalanced seesaw motion. At opposite ends of the fulcrum are a locking finger and the arm. The free-fall dog is unbalanced such that the arm contacts the clover mechanism as it rotates while the locking finger does not contact the clover mechanism at slow rotating speed. At a slow rotative speed, the arm is only slightly deflected. With great acceleration, the arm is deflected farther from the clover mechanism thereby causing the locking finger on the opposite side of the fulcrum of the free-fall dog to be pivoted into the clover mechanism. The locking finger, which upon sufficient force to the arm, is injected into the gap between two protuberances of the clover mechanism by a reactive force to the force asserted on the arm that exceeds the force caused by the unbalanced state. A contact surface on the locking finger engages an engagement edge of the clover mechanism to lock the clover mechanism, which prevents further rotation of the rotative shaft. Thus, the downward movement of the items attached to the rotating shaft is stopped.

The safety lock device allows the rack to freely move up and down at a slow rotative speed with respect to the shaft because only the arm of the free-fall dog contacts the clover mechanism while rotating slowly. The locking finger of the free-fall dog (the shorter end of the seesaw) does not contact the clover mechanism unless a sufficient force is exerted on the arm (the longer end of the seesaw).

The safety lock device can be attached to the rotating shaft at a location away from the chain, gears or other driven mechanisms. Also, more than one safety lock device may be placed on a long rotating shaft. After any cause that makes the rotating shaft rapidly accelerate, the safety lock device of the present invention will preclude rotation of the portion of the shaft to which it is attached.

Another desirable result attained is the ability to unlock the safety lock device by rotating the clover mechanism in the reverse direction from the locked position.

Further objects, features and advantages of the present invention will become apparent from the following description and drawings.

DETAILED DESCRIPTION OF THE INVENTION

Figure 1:
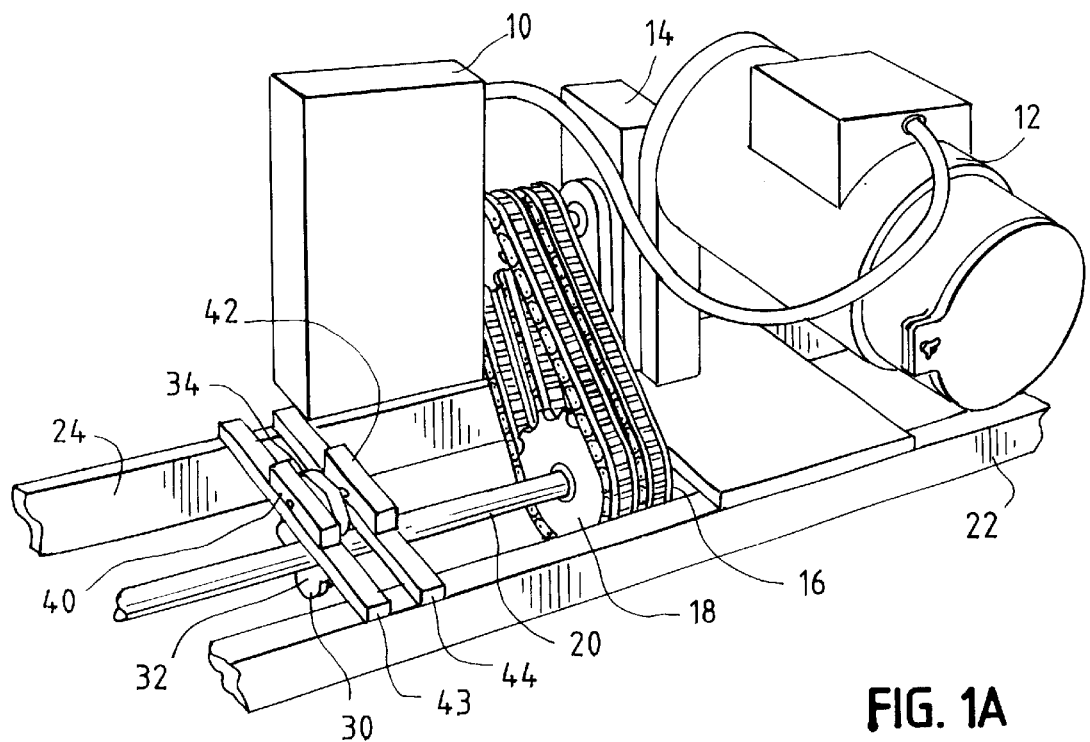
FIG. 1 is a perspective view of the control mechanism for a rack with a safety lock device.
Figure 1A:
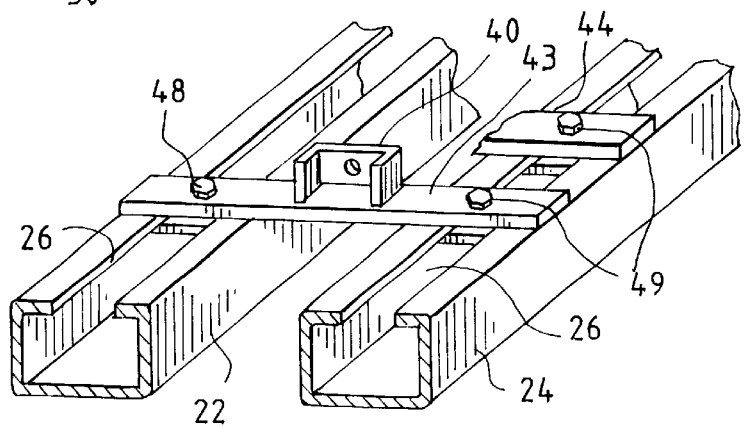
FIG. 1A is a partial perspective view of the rack of FIG. 1.
Figure 1B:
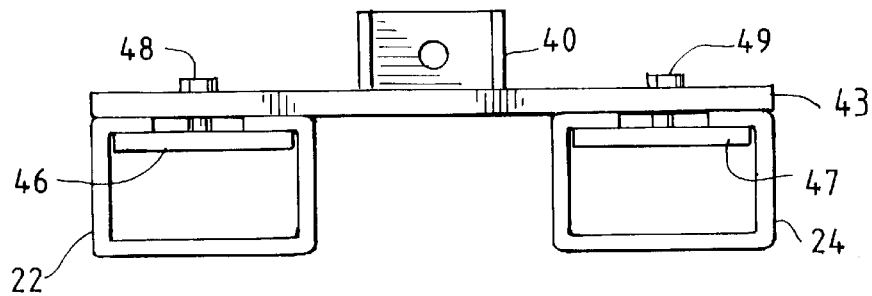
FIG. 1B is an end view of the rack of FIG. 1A.

In the Figures, like reference numerals indicate the same elements throughout. Referring to the drawings, as best seen in FIG. 1, a safety lock device is part of a larger system. FIG. 1 shows a preferred control mechanism for an adjustable rack including a power supply 10 to run an electric motor 12. The electric motor 12 drives a gear drive 14 attached to a chain 16. A toothed gear 18 rotates by the movement of the chain 16, thus, revolving around a rotating shaft 20 causing shaft 20 to rotate. This is the preferred control mechanism. It is contemplated within the scope of this invention that the motor 12 can be any device that imparts or produces motion and may directly drive the rotating shaft 20, and it is further contemplated that the gear 18 may be any rotating cylinder with the chain 16 as a belt or band. These structures for control mechanisms are known in the art. As an overhead mounted apparatus, the entire system may be mounted on side rails 22 and 24. The side rails 22 and 24 are preferably open rectangular side rails as shown in FIG. 1A with top wall having a longitudinal opening 26. The open side rail allows for the various items mounted on the side rails 22 and 24 to be longitudinally adjustable.

Figure 7:
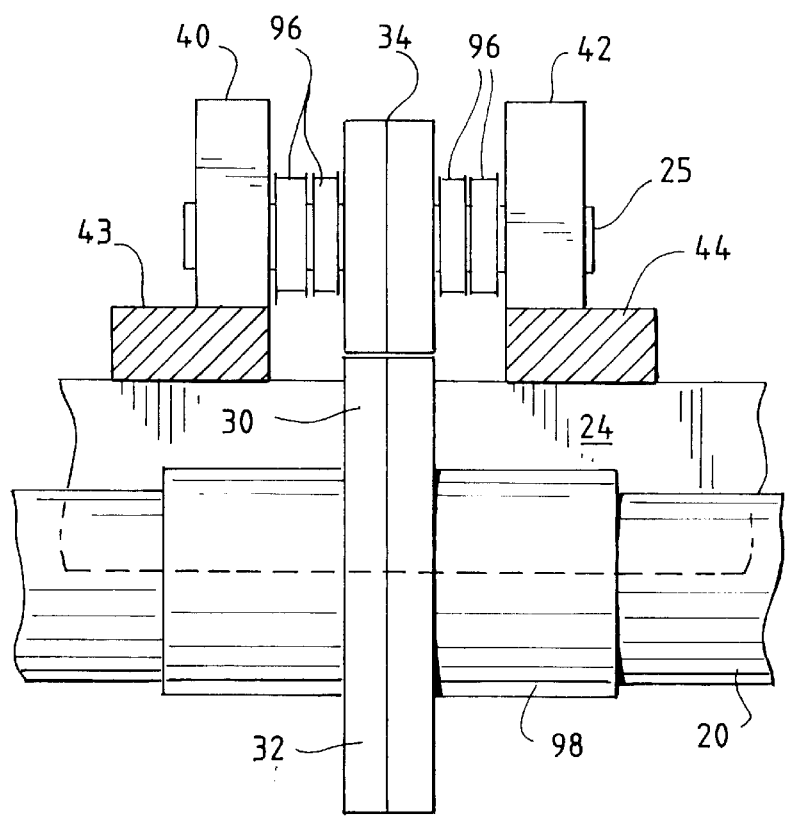
FIG. 7 is a partial cross sectional view of the mounted safety lock device.

FIG. 1 shows a safety lock device 30 consisting of a clover mechanism 32 and a free-fall dog 34. In the shown preferred embodiment, a clover mechanism 32 is fixedly attached to the rotating shaft 20. Also, two side supports 40 and 42 may pivotally mount the free-fall dog 34, preferably with a pin 25, as shown in FIG. 7. Pin 25 is meant to be interpreted broadly to include a nail, needle, peg, bolt, or similar fasteners that allow pivotal movement wherein the pin 25 acts as a fulcrum for free-fall dog 34.

Side supports 40 and 42 may be part of U-shaped brackets mounted on longitudinally adjustable bracket bars 43 and 44 respectively. The brackets are preferably welded to the bracket bars 43 and 44. The distance between the bracket bars 43 and 44 is preferably fixed by a pair of holding bars 46 and 47, which are wider than the longitudinal rail opening 26. The bracket bars 43 and 44 are preferably attached to threaded holding bars 46 and 47 by bolts 48 and 49.

The safety lock device 30 is shown in FIG. 1 as being mounted adjacent the power supply 10 for illustrative purposes only. The safety lock device 30 is generally mounted adjacent one end of the pair of parallel side rails 22 and 24, but may be mounted in any location along the racks desired.

Figure 2:
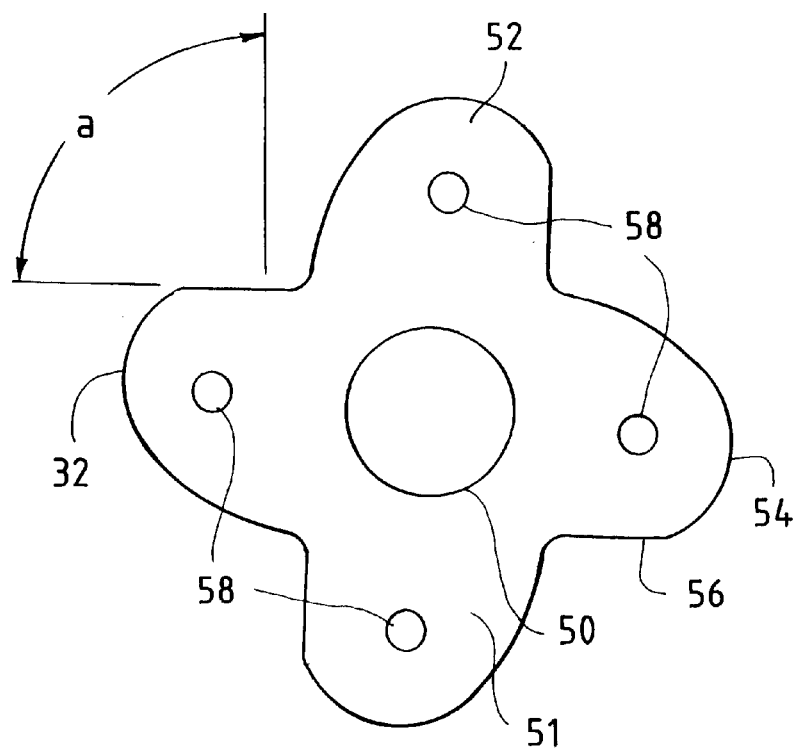
FIG. 2 is a side view of a clover mechanism.

FIG. 2 shows an embodiment of the clover mechanism 32. In the center of the clover mechanism 32 is a rotating shaft aperture 50 for mounting on or securing to the rotating shaft 20. Preferably, rotating shaft 20 passes through aperture 50 and is welded or otherwise fixedly attached. The rotating shaft 20 may be fixedly attached to a face surface 51 of the clover mechanism 32 if there is no aperture, but the safety lock device 30 need not be mounted with the face surface 51 affixed directly to the very end of the rotating shaft 20. A mandrel 98 preferably extends from both sides of the clover mechanism 32 to more strongly secure the clover mechanism 32 to the rotating shaft 20.

The clover mechanism 32 has a plurality of protuberances 52, of which four are shown in FIG. 2. The protuberances 52 are preferably equally spaced and identically shaped. Each protuberance 52 has a curved edge 54 and an engagement edge 56. The curved edge 54 is adapted to allow the clover mechanism 32 to rotate past the free-fall dog 34 if the rotating shaft 20 with the clover mechanism 32 is rotating at a slow controlled speed in a first direction or at any speed in a second direction. The curved edge 54 is curved on both sides of the distal portion of the protuberance 52. The preferred curved portion just past the engagement edge 56 toward the distal portion of the protuberance 52 allows for minimal force upon and movement of the free-fall dog 34 when the clover mechanism 32 is rotating with the engagement edge 56 as the leading edge at a slow controlled speed. The curved edge 54 also minimizes wear on both the clover mechanism 32 and free-fall dog 34 as these two components contact each other while the shaft 20 is rotating. Engagement edge 56 is designed to engage the free-fall dog 34 when the rotating shaft 20 with affixed clover mechanism 32 rotates too quickly. The engagement edge 56 is preferably substantially flat and extends only partially toward the distal portion of the protuberance 52.

An acceptable range for angle "a" shown in FIG. 2 is less than 90 degree and greater than 50 degrees. The best range is slightly less than 90 degrees. Ideally, angle "a" is 88 degrees.

The preferred dimensions for a clover mechanism 32 adapted to be affixed to a 1.5 inch to 1.75 inch steel shaft has a diametric periphery ranging from 5.75 inches to 6.25 inches as used on a 50 fifty feet long (sixteen meters) rotating shaft 20. The radius of gyration ranges approximately 2.875 inches from the point between the protuberances 52 to 3.25 inches at the distal portion of the protuberance 52. The clover mechanism 32 is preferably constructed of quarter inch thick steel plate. The protuberances 52 may have a connecting hole 58. If a thicker clover mechanism 32 is required, two or more clover mechanisms 32 may be attached together through connecting holes 58. A rivet, bolt or similar fasteners may be placed through the connecting hole 58 to secure together two or more clover mechanisms 32. Typically, when used with a 50 fifty feet long (sixteen meters) rotating shaft 20, two clover mechanisms 32 are fastened together for a thickness of one half inch.

Figure 3:
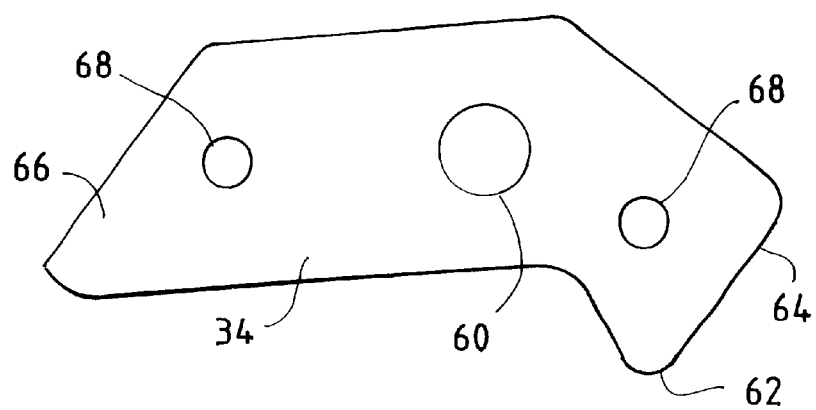
FIG. 3 is a side view of a free-fall dog.

FIG. 3 shows an embodiment of the free-fall dog 34. Free-fall dog 34 has a pin aperture 60 to pivotally mount the free-fall dog 34 preferably on two side supports 40 and 42. The pin aperture 60 acts as a fulcrum upon which the free-fall dog 34 may teeter in an unbalanced seesaw motion. At opposite ends of the fulcrum are the locking finger 62 and the dog arm 66. The free-fall dog 34 is unbalanced such that the dog arm 66 contacts the clover mechanism 32 as it slowly rotates while the locking finger 62 does not contact the clover mechanism 32 at slow rotating speed. The locking finger 62, which upon sufficient force to the dog arm 66 being pushed away from the clover mechanism 32, is injected into the gap between two protuberances 52 of the clover mechanism 32 by a reactive force to the force asserted on the dog arm 66. The force on the dog arm 66 must be great enough to overcome the force keeping the dog arm 66 in close proximity to the clover mechanism 32, which causes the locking finger 62 to move into the clover mechanism 32. Contact surface 64 on the locking finger 62 of the free-fall dog 34 engages engagement edge 56 of the clover mechanism 32 to lock the clover mechanism 32 and thus the rotating shaft 20 to prevent further rotation, and thus downward movement of the items attached to the rotating shaft 20, such as racks 90 consisting of numerous hooks 91 extending therefrom to hold items.

Figure 4:
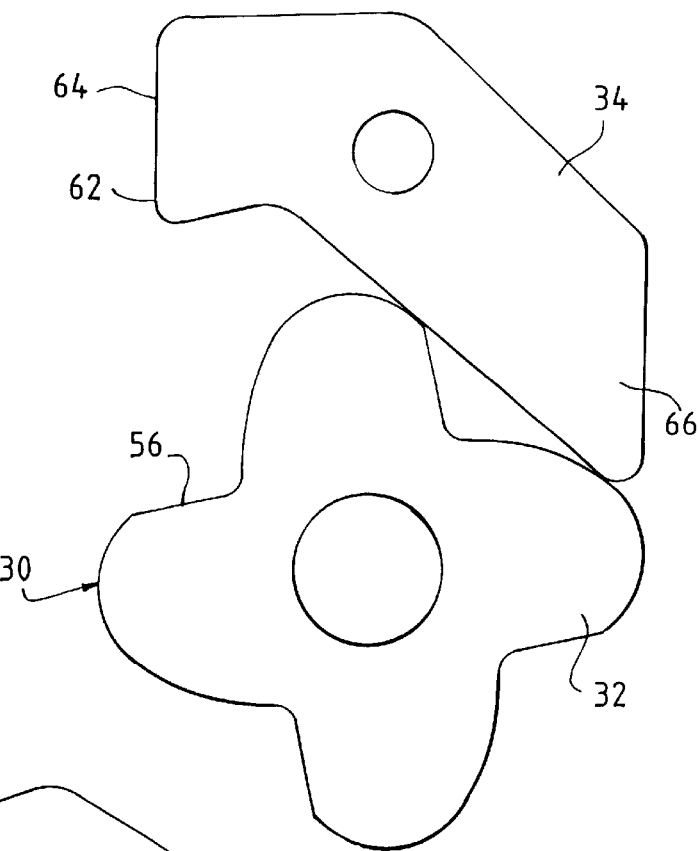
FIG. 4 shows the clover mechanism and free-fall dog of the safety lock device in a position where the rotating shaft is free to rotate.
Figure 5:
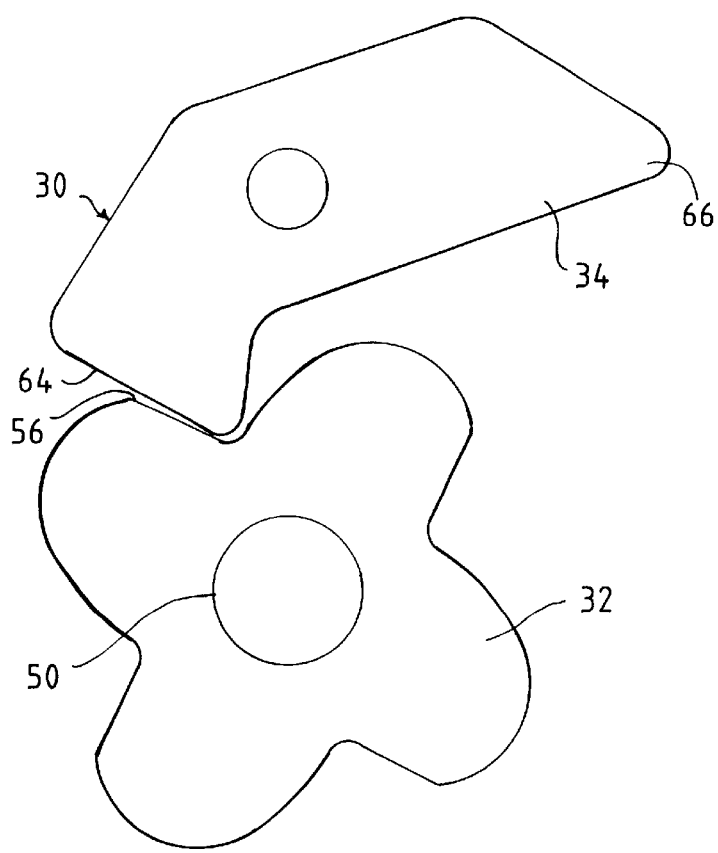
FIG. 5 shows the clover mechanism and free-fall dog of the safety lock device in a locked position.

The unbalanced aspect of the free-fall dog 34 is critical to the present invention. At a slow controlled speed of rotation, the clover mechanism 32 will be in the position shown in FIG. 4 and will not contact the locking finger 62 at all. Dog arm 66 contacts the clover mechanism 32 while clover mechanism 32 rotates slowly. The locking finger 62 is spaced away from the clover mechanism 32 at slow rotating speed. With a rapid advance of the clover mechanism 32, the contact of a protuberance 52 of clover mechanism 32 on the dog arm 66 forces the dog arm 66 rapidly away from the clover mechanism 32 whereby the locking finger 62 is rapidly pivoted toward the clover mechanism 32 like a slightly unbalanced seesaw with the pin 25 in the pin aperture 60 as the fulcrum. FIGS. 3 through 5 show the preferred unbalanced aspect resulting from the dog arm 66 being longer than locking finger 62. The force to move the locking finger 62 into the clover mechanism 32 is ideally obtained by having the dog arm 66 extend farther than locking finger 62 from the fulcrum at which the free-fall dog 34 pivots. The unbalanced state may be obtained by other means of having the dog arm 66 having a greater resistance to acceleration than the locking finger 62, such as weighing more and other methods known to physicists.

The free-fall dog 34, as shown in FIGS. 4, 5 and 7, is ideally positioned directly above the clover mechanism 32, but it may be positioned in any position such that the protuberances 52 of the clover mechanism 32 contact the dog arm 66 of the free-fall dog 34 when the clover mechanism 32 rotates. A position wherein the free-fall dog 34 is not positioned directly above the clover mechanism 32 can be used to affect the unbalanced state of the free-fall dog 34.

The preferred dimensions for a free-fall dog 34 adapted to be affixed to a 1.5 inch to 1.75 inch steel shaft has a length of between 4.5 and 4.75 inches as used with a 50 fifty feet long (sixteen meters) rotating shaft 20. The free-fall dog, as shown in FIG. 3, has two parallel sides extending across the fulcrum and a tapered edge on the dog arm 66 so it can extend farther without as much weight, while the locking finger 62 is angled from the fulcrum so that it forms a contact surface 64. The free-fall dog 34 is preferably constructed of quarter inch thick steel. If a thicker free-fall dog 34 is required, two or more free-fall dogs 34 may be attached together through connecting holes 68. A rivet, bolt or similar fasteners may be placed through the connecting hole 68 to secure together two or more free-fall dogs 34. Typically when used with a 50 fifty feet long (sixteen meters) rotating shaft 20, two free-fall dogs 34 are fastened together for a thickness of one half inch. Ideally, the free-fall dog 34 is the same thickness as the clover mechanism 32.

The safety lock device 30 only works in one direction where the engagement edge 56 is the leading edge. When the clover mechanism 32 is rotated such that the curved edge 54 is the leading edge, the free-fall dog 34 will never lock in that direction. This would equate to rotation such that the rack 90 is moving in an upward direction, but at failure, the rack 90 will move downward due to gravity, and the direction of rotation will change such that the engagement edge 56 is the leading edge; thus, the safety lock device 30 will still function. Also, if for any reason the safety lock engages, the free-fall dog 34 can be released from engaging the engagement edge 56 by merely rotating the clover mechanism 32 such that the curved edge 54 is the leading edge.

In greater detail, with reference first directed to FIGS. 1 through 3, a safety lock device 30 embodying the invention is illustrated. The safety lock device 30 in FIG. 4 shows the clover mechanism 32 and free-fall dog 34 in a position where the rotating shaft 20 is free to rotate.

FIG. 5 shows the safety lock device 30 in a locked position wherein the contact surface 64 of the free-fall dog 34 engages the engagement edge 56 of the clover mechanism 32. In this position, the rotating shaft 20 affixed at the aperture 50 of the clover mechanism 32 cannot rotate further. Without rotation of the rotating shaft 20, the rack 90 as described cannot move downward.

Figure 6:
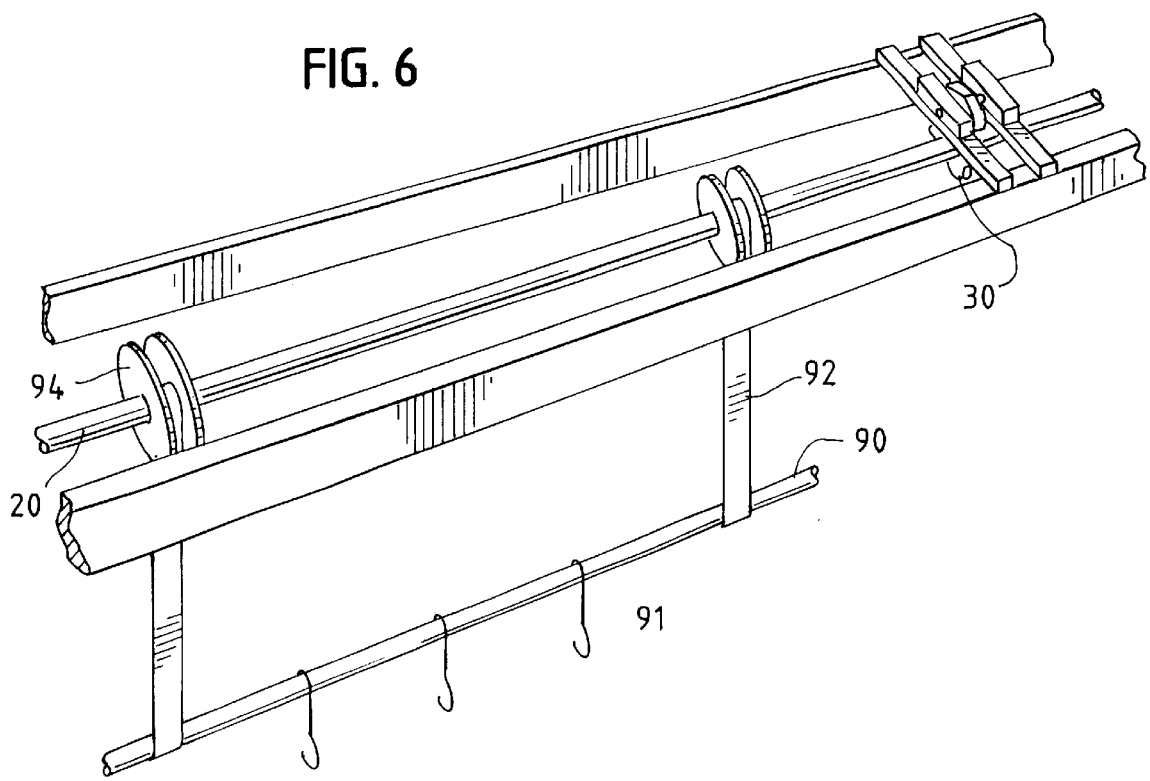
FIG. 6 is a front elevational perspective view of a rack with the present invention.

FIG. 6 shows a schematic of a rack 90 having hangers 91 mounted on a flexible strap 92, which is attached to a support cylinder 94 mounted on the rotating shaft 20. Hangers 91 can be various types of hangers, such as hooks, brackets or loops extending downwardly from the rack 90. The flexible strap 92 may be any long, narrow strip of pliant material, such as leather or nylon, that is durable enough to hold a load on the rack 90. A support cylinder 94 is preferred to guide the flexible strap 92 and provide a larger circumference than the rotating shaft 20. Rack 90 can be raised when the flexible strap 92 is wrapped around the rotating shaft 20 (or the preferred support cylinder 94 affixed to the rotating shaft 20) and can be lowered when the strap 92 is unwrapped from the rotating shaft 20. The rack 90 can be raised and lowered as needed to load, view or remove items from the rack.

FIG. 7 is a cross sectional view of the mounted safety device. The pivotally mounted free-fall dog 34 is shown mounted between two side supports 40 and 42 with non-binding washers 96 to reduce friction and wear on the free-fall dog 34 and two side supports 40 and 42. A mandrel 98 preferably extends from both sides of the clover mechanism 32 to more strongly secure the clover mechanism 32 to the rotating shaft 20.

While the invention has been described in connection with preferred embodiments for the safety lock device, a wide range of equivalents is encompassed in the scope of the claims appended hereto.

Other modifications, embodiments and equivalent clover mechanisms, free-fall dogs, and methods are envisioned within the scope of the invention. Various features of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. A safety lock device comprising:

a clover mechanism to be fixedly attached to a rotating shaft; the clover mechanism having a plurality of protuberances; each protuberance having a curved edge and an engagement edge; on each protuberance of the clover mechanism, the curved edge is curved on both sides of a distal portion of the protuberance and the engagement edge is substantially flat and extends only partially toward the distal portion of each protuberance; and a free-fall dog having a fulcrum with an arm and a locking finger on opposite ends of the fulcrum in an unbalanced state;

wherein the free-fall dog is to be mounted such that the arm of the free-fall dog contacts the protuberances of the clover mechanism when the clover mechanism rotates with the rotating shaft and the locking finger only engages the engagement edge of the clover mechanism after a force on the arm is sufficient to overcome the unbalanced state.

2. The safety lock device of claim 1 wherein the Fulcrum is at a pin aperture in the free-fall dog and the device further includes a pin upon which the free-fill dog is pivotally mounted.

3. The safety lock device of claim 1 wherein both intersections of the substantially flat engagement edge and each adjacent curved edge are arched.

4. The safety lock device of claim 3 wherein the intersection adjacent the rotating shaft is concave and the intersection at the distal portion of the protuberance is convex.

5. The safety lock device of claim 1 wherein the arm of the free-fall dog extends further from the fulcrum than the locking finger on the opposite end of the free-fall dog.

6. The safety lock device of claim 1 wherein the locking finger of the free-fall dog engages the engagement edge of the clover mechanism in only one direction where the engagement edge is leading edge of the rotating clover mechanism.

7. A rotating shaft safety lock device for a rotating shaft that controls the vertical movement of items; the safety lock device comprising:

a clover mechanism to be fixedly attached to the rotating shaft; the clover mechanism having a plurality of protuberances; each protuberance having a curved edge and an engagement edge; the curved edge being curved on both sides of a distal portion of each protuberance; the engagement edge being substantially flat and extending only partially toward the distal portion of each protuberance; and a free-fall dog having a fulcrum with an arm and a locking finger on opposite ends of the fulcrum in an unbalanced state; the arm of the free-fall dog extending further from the fulcrum than the locking finger on the opposite end of the free-fall dog; the free-fall dog having a substantially flat contact surface adapted to engage substantially the entire engagement edge of the clover mechanism;

wherein the free-fall dog is mounted such that the arm of the free-fall dog contacts the protuberances of the clover mechanism and the locking finger is spaced from the protuberances when the clover mechanism slowly rotates with the rotating shaft and the engagement edges as leading edge of the rotating clover mechanism; and wherein the locking finger of the free-fall dog engages the engagement edge of the clover mechanism in only one direction where the engagement edge is the leading edge of the rotating clover mechanism and when the curved edge causes sufficient force on the arm of the free-fall dog to pivot the free-fall dog such that the arm is pushed away from the clover mechanism.

8. The rotating shaft safety lock device of claim 7 having four equally spaced protuberances.

9. A vertically adjustable rack apparatus adapted to be hung from a rotating shaft, the rotating shaft being driven by a control mechanism; the improvement comprising a safety lock device associated with the rotating shaft including:

a clover mechanism fixedly attached to the rotating shaft; the clover mechanism having a plurality of protuberances; each protuberance having a curved edge and an engagement edge; on each protuberance of the clover mechanism, the curved edge is curved on both sides of a distal portion of the protuberance and the engagement edge is substantially flat and extends only partially toward the distal portion of each protuberance; and a free-fall dog having a fulcrum with an arm and a locking finger on opposite ends of the fulcrum in an unbalanced state; wherein the free-fall dog is mounted such that the arm of the free-fall dog contacts the protuberances of the clover mechanism when the clover mechanism relates with the rotating shaft and the locking finger only engages the engagement edge of the clover mechanism alter a force on the arm is sufficient to overcome the unbalanced state.

10. The apparatus of claim 9 wherein the fulcrum of the safety lock device is at a pin aperture in the free-fall dog and the device further includes a pin upon which the free-fall dog is pivotally mounted.

11. The apparatus of claim 9 wherein an angle of the substantially flat engagement edge to a line perpendicular to the line passing through the center of the clover mechanism and the distal portion of the next protuberance is less than 90 degree and greater than 50 degrees.

12. The apparatus of claim 11 wherein the angle is approximately 88 degrees.

13. The apparatus of claim 9 wherein the arm of the frce-fall dog extends further from the fulcrum than the locking finger on the opposite end of the free-fall dog.

14. The apparatus of claim 9 wherein the locking finger of the free-fall dog engages the engagement edge of the clover mechanism in only one direction where the engagement edge is leading edge of the rotating clover mechanism.

* * * * *